United States Patent [19]

Chau

[11] Patent Number: 5,196,229

[45] Date of Patent: Mar. 23, 1993

[54] COATED PHOSPHOR ARTICLES

[75] Inventor: Chung N. Chau, Sayre, Pa.

[73] Assignee: GTE Products Corporation, Danvers, Mass.

[21] Appl. No.: 396,193

[22] Filed: Aug. 21, 1989

[51] Int. Cl.$^5$ ............................................. B05D 00/00
[52] U.S. Cl. ........................................ 427/66; 427/64; 427/67; 427/215; 427/226; 427/372.2
[58] Field of Search ................ 427/66, 64, 226, 372.2, 427/215, 67

[56] References Cited

U.S. PATENT DOCUMENTS 3,544,354 12/1970 Kachel ................................... 427/64
3,927,224 12/1975 Levene ................................... 427/64

Primary Examiner—Janyce Bell
Attorney, Agent, or Firm—James Theodosopoulos

[57] ABSTRACT

Phosphor particles are coated with a continuous, non-particulate, conformal coating of a metal oxide by suspending the phosphor particles in a gel solution containing a metal alkoxide. The gel suspension is then gelled after which the gelled suspension is dried, during which process the metal alkoxide is converted to metal oxide which coats the particles. Such coated phosphor particles can improve maintenance of lamps in which they are employed.

1 Claim, No Drawings

COATED PHOSPHOR ARTICLES

This invention concerns lamp phosphors, particularly a method of increasing lumen maintenance of such lamps. The method involves the deposition of a continuous, non-particulate, conformal coating on individual phosphor particles, which coating results in improvement of lamp maintenance. Such a coating is disclosed in U.S. Pat. Nos. 4,585,673, 4,710,674 and 4,825,124. However, the coating method disclosed therein involves vapor deposition on phosphor particles in a fluidized bed and requires quite elaborate equipment.

Other methods of forming continuous coatings on phosphor particles, such as by dip coating or evaporating to dryness solutions in which phosphor particles are suspended, such as are disclosed in U.S. Pat. Nos., 2,151,496, 4,287,229 and 4,339,501, do not result in improved maintenance.

In this invention phosphor particles are suspended in a solution containing a metal alkoxide, for example, an isopropoxy or an ethoxy compound, which is then caused to gel. The gelled suspension is then aged and/or dried to form a dried cake which can be readily broken up into a powder. This process results in a continuous, non-particulate, conformal coating on the phosphor particles. During the gelling and drying process, the alkoxide hydrolyzes and polymerizes and reacts to form an oxide coating on each phosphor particle with substantially all organic matter eliminated from the oxide coating.

EXAMPLE 1

A suspension consisting of 50 gm (grams) of aluminum isopropoxide $Al(OC_3H_7)_3$ and 450 ml (milliliters) of water was stirred at 80° C. for 30 minutes. At the end of the half-hour, 0.75 ml of concentrated nitric acid was added and the solution was boiled at 100° C. for 24 hours in a reflux condenser. The nitric acid is a catalyst for the gelling reaction. At the end of the 24th hour a clear slightly cloudy solution resulted. Four hundred grams of Cool White calcium halophosphate phosphor powder (Sylvania type 4450) were added to the solution, which was kept at 100° C. Upon stirring and slight evaporation for about 30 minutes, the suspension gelled. The gelled suspension was placed in a drying oven at 110° C. for 24 hours. The dried phosphor, now coated with aluminum oxide, was broken up by hand and sieved through a 325 mesh nylon screen.

EXAMPLE 2

Particles of calcium halophosphate (type 4450) were coated with aluminum oxide as in Example 1. However the oven dried phosphor was annealed at 600° C. in air for an additional two hours.

EXAMPLE 3

A solution of 100 ml $Si(OEt)_4$ (tetraethyl orthosilicate), 40 ml DMF (dimethyl formamide), 180 ml ethyl alcohol, 70 ml water and 1.8 ml 0.001M $NH_4OH$ as a catalyst was stirred at 50° C. for two hours. Four hundred grams of type 4450 phosphor was stirred into the solution, which gelled upon addition of the phosphor. The gelled suspension was let standing for aging at 50° C. for another two hours. Excess solvent separated out. The excess solvent was poured out and the gel was oven dried at 235° C. for 24 hours followed by annealing at 500° C. in air for one hour. The resulting silicon dioxide coated phosphor was broken up by hand and sieved through a 325 mesh nylon screen. ESCA study of the coated phosphor showed total coverage of the phosphor surface by silicon dioxide.

The coated type 4450 phosphors of Examples I, II and III along with an uncoated type 4450 phosphor as a control were processed into standard 4 foot, 30 watt, T12 Cool White fluorescent lamps and tested for maintenance. The results are reported in Table 1.

TABLE 1

| Example | Coating | FSSS | 0 hours Lumens | 100 hours Lumens | Maintenance |
|---------|---------|------|----------------|------------------|-------------|
| I | $Al_2O_3$ | 6.0 | 2979 | 2959 | 99.3% |
| II | $Al_2O_3$ | 6.2 | 3015 | 2978 | 98.8% |
| III | $SiO_2$ | 5.6 | 2734 | 2695 | 98.6% |
| Control | None | 6.4 | 3073 | 3013 | 98.1% |

Type 4450 phosphor is calcium fluorochlorophosphate activated by antimony and manganese. Tables II and III show the results of the ESCA studies for the phosphor of Example III. Table II shows the percent attenuation of the ESCA signal for calcium, fluoride and phosphorus.

TABLE II

| Run No. | Ca | F | P |
|---------|-----|------|-----|
| 1 | 94% | 100% | 92% |
| 2 | 94% | 100% | 95% |

Table III shows the atomic percent present on the phosphor surface for calcium, oxygen, fluorine, phosphorus, manganese and silicon.

TABLE III

| Run No. | Ca | O | F | P | Mn | Si |
|---------|------|----|---|------|----|----|
| 1 | 1.1 | 71 | 0 | 0.98 | 0 | 27 |
| 2 | 0.91 | 73 | 0 | 0.60 | 0 | 26 |

These results show the substantially complete coating of the phosphor particle surface by silicon dioxide.

EXAMPLE 4

A solution of 100 ml $Si(OEt)_4$, 40 ml DMF, 180 ml EtOH, 70 ml $H_2O$, and 1.8 ml 0.001M $NH_4OH$ was stirred at 55° C. for 2 hours. Four hundred grams of zinc silicate phosphor (Sylvania Type 2288), was added to this solution. The suspension was let standing for aging at 55° C. for 12 hours. The resulting gelled suspension was oven dried at 110° C. for 3 hours and then at 200° C. for another 12 hours. The dried phosphor was annealed at 500° C. for one hour. The resulting coated phosphor was sieved through a 325 mesh nylon screen. Surface study of the coated phosphor by ESCA showed a 95% attenuation of the Zn signal.

EXAMPLE 5

A suspension of 50 grams $Al(OC_3H_7)_3$ and 600 ml $H_2O$ was stirred at 80° C. for 30 minutes. At the end of the half-hour, 0.75 ml of concentrated $HNO_3$ was added and the solution was boiled at 100° C. for 24 hours under reflux condition. At the end of the 24th hour a clear solution resulted. Four hundred grams of the zinc silicate phosphor (Type 2288) was added. The suspension was kept at around 100° C. Upon stirring for an hour, 1 ml of concentrated $NH_4OH$ was added (resulting pH~8). This resulted in a gelation of the suspension. The gel was then aged for 3 hours at 80° C. and then oven dried at 100° C. for 16 hours. The coated phosphor was then sieved through a 325 mesh nylon screen. ESCA study showed an 83% attenuation of the Zn signal.

Table IV shows the maintenance results for the coated phosphors of Examples 4 and 5 along with an uncoated phosphor as a control in 4 foot, 30 watt, T12 lamps.

TABLE IV

| Example | Coating | 0 hours lumens | 100 hours lumens | Maintenance |
|---|---|---|---|---|
| 4 | $SiO_2$ | 4620 | 4493 | 97.3% |
| 5 | $Al_2O_3$ | 4927 | 4078 | 82.8% |
| Control | None | 5165 | 3718 | 72.0% |

Table V shows ESCA surface analysis results in atomic percent for the coated phosphors of Examples 4 and 5 as well as the control.

TABLE V

| Example | Zn | Si | O | Al | Mn | W |
|---|---|---|---|---|---|---|
| 4 | 1.4 | 27 | 71 | — | 0 | 0 |
| 5 | 4.7 | 3.5 | 69 | 26 | 0.3 | 0 |
| Control | 76 | 11 | 61 | — | 0.82 | 0.20 |

EXAMPLE 6

A solution of 17.8 ml $Si(OEt)_4$, 6.2 ml DMF, 30 ml EtOH, 11.5 ml $H_2O$ and 0.15 ml 1M $NH_4OH$ was stirred at 50° C. for 6 hours. Fifty grams of zinc sulfide EL phosphor (Sylvania Type 723) was added to the solution. The stirred suspension formed a gel overnight. It was then oven dried at 60° C. for 12 hours. The coated phosphor was sieved through a 325 mesh nylon screen.

EXAMPLE 7

A solution of 23 gm $C_3H_7OH$, 0.6 ml $H_2O$ and 0.3 $HNO_3$ was added to a 5 gm $Ti(OC_3H_7)_4$ solution at room temperature. The clear yellowish solution was stirred for 30 minutes. At the end of the half-hour 14 grams of the zinc sulfide phosphor (Type 723) was added to the solution. The stirred suspension started to gel in about one hour. The gelled suspension was air dried and sieved through a 325 mesh nylon screen.

EXAMPLE 8

A solution of 5 gm $C_3H_7OH$, 0.6 ml $H_2O$ and 0.3 ml 1M $HNO_3$ was added to 5 gm of $Zr(OC_3H_7)_4$. This resulted in a cloudy suspension. Twenty-five grams of the zinc sulfide phosphor (Type 723) was added to the suspension. After the suspension gelled, it was dried at 50° C. overnight. The dried phosphor was sieved through a 325 mesh nylon screen.

EXAMPLE 9

A solution of 12 gm $Al(OC_3H_7)_3$ and 150 ml $H_2O$ was stirred at 80° C. for a half hour. About 0.15 ml of concentrated $HNO_3$ was added to the solution at 100° C. which was then kept at 100° C. under reflux for 24 hours. At the end of the 24th hour 25 gm of the zinc sulfide phosphor (Type 723) was added. The suspension started to gel in about 1 hour and was then aged at 85° C. for 12 hours. The gelled suspension was oven dried at 100° C. for 4 hours and then sieved through a 325 mesh nylon screen.

The electroluminescent phosphors of Examples 6, 7, 8 and 9 along with an uncoated phosphor as a control were made into 120 V, 400 Hz thick film lamps and evaluated for maintenance. The results are shown in Table VI.

TABLE VI

| Example | Coating | 2 hour foot-lamberts | 360 hour foot-lamberts | Maintenance |
|---|---|---|---|---|
| 6 | $SiO_2$ | 27.3 | 15.2 | 55.6% |
| 7 | $TiO_2$ | 18.7 | 10.8 | 57.8% |
| 8 | $ZrO_2$ | 19.8 | 11.7 | 59.1% |
| 9 | $Al_2O_3$ | 38.0 | 17.0 | 44.7% |
| Control | None | 42.1 | 19.5 | 46.3% |

Table VII shows surface analysis in atomic percent and percent attenuation.

TABLE VII

| Example | Zn | S | O | Si | Ti | Zr | % Attenuation Zn | S |
|---|---|---|---|---|---|---|---|---|
| 6 | 2.0 | 1.8 | 69 | 27 | — | — | 94 | 94 |
| 7 | 15 | 11 | 55 | — | 19 | — | 53 | 62 |
| 8 | 4.7 | 3.0 | 70 | — | — | 22 | 85 | 89 |
| Control | 32 | 39 | 29 | — | — | — | — | — |

In the manufacture of lamps containing coated phosphor particles as per this invention, the phosphor particles are deposited as a layer on a lamp substrate. In the case of a fluorescent lamp, the lamp substrate could be a tubular glass envelope, and in the case of an electroluminescent lamp, the lamp substrate could be a flat glass panel, after which the phosphor-layered lamp substrate could be processed into a finished lamp as per known methods.

I claim:

1. A method of providing a continuous, non-particulate, conformal coating on phosphor particles comprising the steps of: suspending phosphor particles in a gel solution containing a metal alkoxide; maintaining the phosphor particles in suspension while causing the suspension to gel; and drying the gelled suspension whereby the metal alkoxide is converted to metal oxide and whereby the phosphor particles are coated with a continuous, non-particulate, conformal coating of the metal oxide, wherein the metal alkoxide is an ethoxy compound and wherein the gel suspension contains ammonium hydroxide as a catalyst.

* * * * *